US008522750B2

(12) United States Patent
Flanagan et al.

(10) Patent No.: US 8,522,750 B2
(45) Date of Patent: Sep. 3, 2013

(54) METHOD AND APPARATUS FOR AUTOMATIC PRESSURE BALANCING OF INDUSTRIAL LARGE-BORE INTERNAL COMBUSTION ENGINES

(75) Inventors: Edward Flanagan, Knoxville, TN (US); Steve Follmar, Montgomery, TX (US); William Griffith, Corryton, TN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1006 days.

(21) Appl. No.: 12/572,744

(22) Filed: Oct. 2, 2009

(65) Prior Publication Data
US 2010/0089364 A1 Apr. 15, 2010

Related U.S. Application Data

(60) Provisional application No. 61/102,214, filed on Oct. 2, 2008.

(51) Int. Cl.
*F02M 7/00* (2006.01)
*G01M 15/00* (2006.01)

(52) U.S. Cl.
USPC ........................................ 123/435; 73/114.17

(58) Field of Classification Search
USPC ................... 73/114.16, 114.17; 123/406.22, 123/406.23, 406.24, 406.41, 406.42, 406.43, 123/435; 701/103, 104, 111; 702/199
See application file for complete search history.

(56) References Cited

U.S. PATENT DOCUMENTS

| | | | |
|---|---|---|---|
| 5,398,724 A | 3/1995 | Vars et al. | |
| 5,582,151 A | 12/1996 | Wertheimer | |
| 6,209,520 B1 | 4/2001 | Kolmanovsky et al. | |
| 6,276,334 B1 | 8/2001 | Flynn et al. | |
| 6,286,482 B1 | 9/2001 | Flynn et al. | |
| 6,484,694 B2 | 11/2002 | Thomas | |
| 6,843,231 B1 | 1/2005 | Duffy et al. | |
| 6,981,488 B2 * | 1/2006 | Harris et al. | 123/435 |
| 7,073,485 B2 * | 7/2006 | Truscott et al. | 123/406.22 |
| 7,178,507 B1 | 2/2007 | Gangopadhyay | |
| 7,475,673 B1 * | 1/2009 | Fattic | 123/435 |
| 2010/0089364 A1 * | 4/2010 | Flanagan et al. | 123/435 |

* cited by examiner

*Primary Examiner* — Stephen K Cronin
*Assistant Examiner* — Sizo Vilakazi
(74) *Attorney, Agent, or Firm* — Berenato & White, LLC

(57) ABSTRACT

A method and apparatus for providing automatic pressure balancing of an internal combustion engine. The engine includes cylinders, fuel injector valves provided to selectively deliver fuel directly into the cylinders, fuel-balancing valves each fluidly connected to the fuel injector valves for controlling the fuel delivered to the fuel injector valves and cylinder pressure sensors each mounted to one of the cylinders. The method comprises an automatic pressure balancing procedure including the steps of monitoring a cylinder pressure in each of the cylinders, determining a peak combustion pressure produced in each of the cylinders, calculating a mean peak pressure produced in all of the cylinders, calculating a pressure difference between the mean and the peak pressure and incrementally adjusting the fuel delivered by one of the fuel-balancing valves to the corresponding fuel injector valve mounted to the cylinder having the pressure difference larger than a predetermined pressure value.

32 Claims, 5 Drawing Sheets ns of the Invention
METHOD AND APPARATUS FOR AUTOMATIC PRESSURE BALANCING OF INDUSTRIAL LARGE-BORE INTERNAL COMBUSTION ENGINES

CROSS-REFERENCE TO RELATED APPLICATION

This Application claims the benefit under 35 U.S.C. 119(e) of U.S. Provisional Application Ser. No. 61/102,214 filed Oct. 2, 2008 by William Griffith et al., which is hereby incorporated herein by reference in its entirety and to which priority is claimed.

BACKGROUND OF THE INVENTION

1. Field of the Invention

The present inventions relates to pressure balancing of internal combustion engines in general, and more particularly to a method and an apparatus for automatic pressure balancing of an internal combustion engine.

2. Description of the Prior Art

Industrial, stationary large-bore, slow-speed gaseous fuel operated internal combustion engines with cam-actuated gaseous fuel direct injector valves, such as Cooper-Bessemer 10V-250, are typically used in the natural gas pipeline industry, and in other fringe applications, and are well known in the art. The above stationary, gaseous fueled, large-bore, slow-speed engines often produce excessive exhaust emissions when the work load on the engine including multiple power cylinders is not shared equally among individual the power cylinders. Combustion pressure imbalance leads to some of the cylinders being overloaded and other cylinders having very poor and/or incomplete combustion. The overloaded cylinders will produce excessive levels of NOx, while the under-loaded cylinders with their late/poor combustion tend to produce excessive amounts of formaldehydes and CO. Also, the overloaded cylinders may have a tendency to experience detonation leading to wear and tear on mechanical parts and bearings, while the cylinders with poor combustion cause excessive fuel consumption (thus, the inordinate fuel expenses) because unburned fuel is being dumped to the exhaust system. Currently, these engines are equipped with manually operated balancing valves to adjust fuel delivery to each cylinder in order to pressure balance the power cylinder loading. The adjustment is typically done manually by an engine operator on an infrequent basis such as weekly or monthly. At many sites balancing is done at a much greater time interval. Unfortunately, as operating conditions of the engine change due to changes to an engine load and an engine speed, fuel quality variations, an inlet air temperature, humidity, ignition and mechanical problems, etc., the engine's balance is affected, thus the engine balance is not maintained during periods between the manual balance adjustments.

Therefore, the stationary, large-bore, slow-speed gaseous fuel operated internal combustion engines are susceptible to improvements that may enhance their performance and reduce operating cost. With this in mind, a need exists to develop a method and apparatus for automatic, continuous pressure balancing of an internal combustion engine with improved performance, inexpensive, and providing low operating cost.

SUMMARY OF THE INVENTION

The present invention provides a method and an apparatus for automatic pressure balancing of an internal combustion engine.

According to one aspect of the invention, a method for automatic pressure balancing of an internal combustion engine is provided. The engine includes a plurality of cylinders each having a reciprocating piston and a rotating crankshaft operatively connected to the piston, a plurality of fuel injector valves each provided to selectively deliver an amount of fuel directly into one of the cylinders, a corresponding plurality of adjustable fuel-balancing valves each fluidly connected to one of the fuel injector valves for controlling the amount of fuel delivered to the one of the fuel injector valves and a plurality of cylinder pressure sensors each mounted to one of the cylinders to sense a pressure within one of the cylinders and to provide an output signal representing the cylinder pressure. The method comprises an automatic engine balancing process including an automatic pressure balancing procedure including the steps of monitoring a cylinder pressure in each of the cylinders during an engine cycle, determining a peak combustion pressure produced in each of the cylinders during the engine cycle, calculating a mean of the peak combustion pressures produced in all of the cylinders during the engine cycle, calculating a pressure difference between the mean and the peak cylinder pressure produced in each of the cylinders during the engine cycle for each of the cylinders, and incrementally adjusting the amount of fuel delivered by one of the adjustable fuel-balancing valves to the corresponding one of the fuel injector valves mounted to one of the cylinders having the pressure difference larger than a predetermined pressure value.

According to another aspect of the invention, there is an apparatus for automatic pressure balancing of the internal combustion engine. The apparatus of the present invention comprises a plurality of cylinder pressure sensors each mounted to one of the cylinders to sense a pressure within one of the cylinders and to provide an output signal representing the cylinder pressure, a device for instantaneous detection of a speed and angular position of a crankshaft of the engine generating a signal indicating the speed and angular position of the crankshaft of the engine, a plurality of valve position sensors each provided to indicate a positive movement and a position of one of the fuel-balancing valves, a cylinder pressure monitoring (CPM) module receiving data from the cylinder pressure sensors and the engine crankshaft speed and angular position detection device, and an auto-balance controller for controlling the fuel-balancing valves based on data provided by the CPM module and the valve position sensors. The CPM module is provided for monitoring a cylinder pressure in each of the cylinders during an engine cycle, determining a peak combustion pressure produced in each of the cylinders during the engine cycle, calculating a mean of the peak combustion pressures produced in all of the cylinders during the engine cycle and calculating a pressure difference between the mean and the peak cylinder pressure produced in each of the cylinders during the engine cycle for each of the cylinders. In turn, the auto-balance controller is provided for incrementally adjusting the amount of fuel delivered by one of the adjustable fuel-balancing valves to the corresponding one of the fuel injector valves mounted to one of the cylinders having the pressure difference larger than a predetermined pressure value.

The method and apparatus for automatic pressure balancing of an internal combustion engine according to the present invention provide a simple, reliable, and low cost system to insure improved performance of a mechanically healthy engine that can maintain a good balance state at low operating cost. The present invention allows for simple and low cost retrofitting of the existing stationary, large-bore, slow-speed internal combustion engine with the apparatus of the present invention. The method and apparatus of the present invention automatically balance the power distribution of an engine among the individual cylinders, preventing unexpected overloading of individual cylinders, thus minimizes unacceptable emissions, such as NOx emissions, production of the engine. The manually operated balancing valves are replaced with electronically controlled motorized fuel-balancing valves and an auto-balance controller to control them.

BRIEF DESCRIPTION OF THE DRAWINGS

Other objects and advantages of the invention will become apparent from a study of the following specification when viewed in light of the accompanying drawings, wherein.

DESCRIPTION OF PREFERRED EMBODIMENTS

Figure 1:
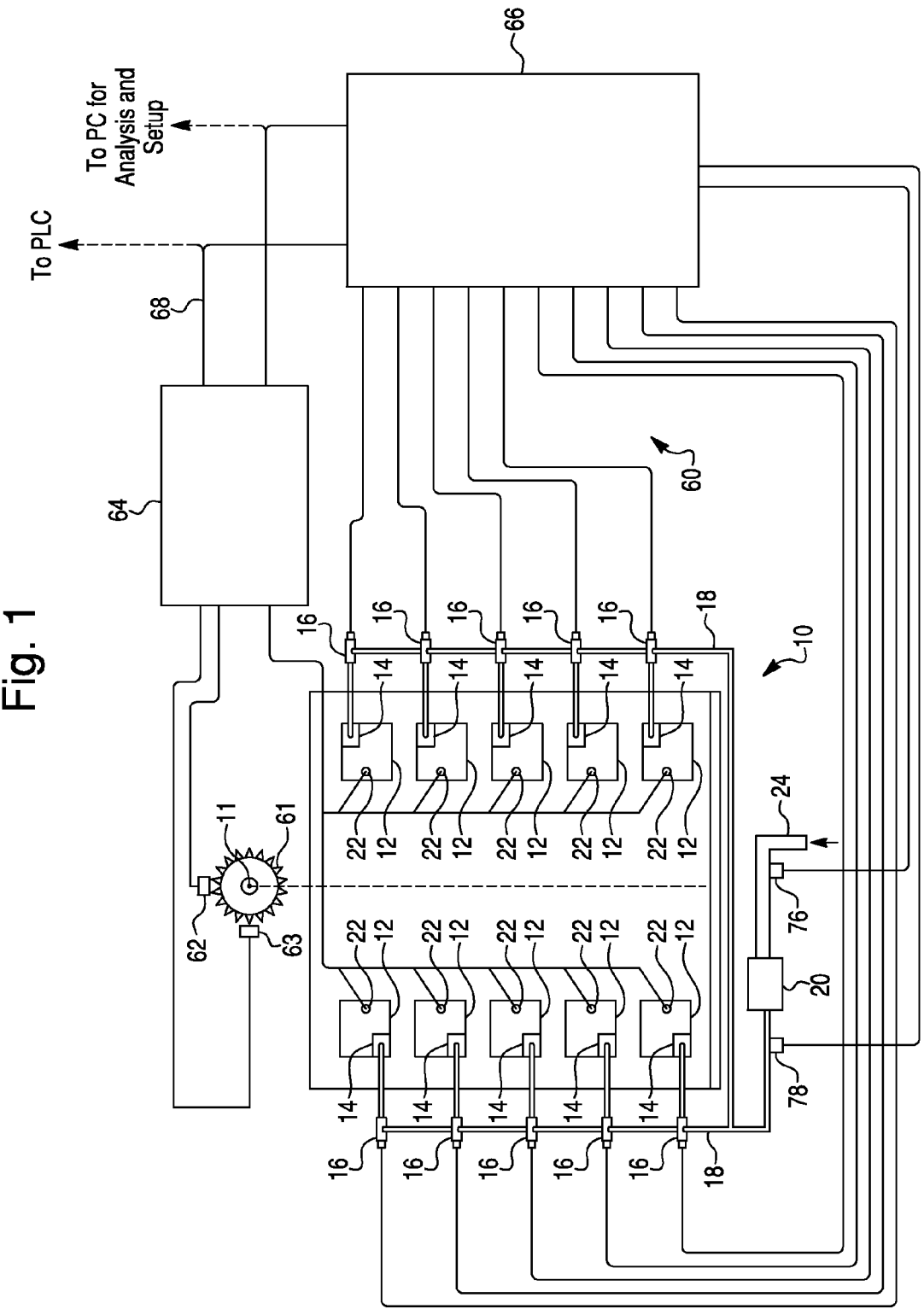
FIG. 1 is a schematic view of a multi-cylinder, multi-cylinder internal combustion engine internal combustion engine and an electronic control system for automatic, continuous pressure balancing and diagnosis of the internal combustion engine in accordance with the exemplary embodiment of the present invention.

The preferred embodiment of the present invention will now be described with the reference to accompanying drawings.

For purposes of the following description, certain terminology is used in the following description for convenience only and is not limiting. The words "top", "bottom", "right", "left", "lower", "upper", "inner" and "outer" designate directions in the drawings to which reference is made. The words "uppermost" and "lowermost" refer to position in a vertical direction relative to a geometric center of the apparatus of the present invention and designated parts thereof. The terminology includes the words above specifically mentioned, derivatives thereof and words of similar import. Additionally, the word "a" as used in the claims means "at least one".

Figure 2:
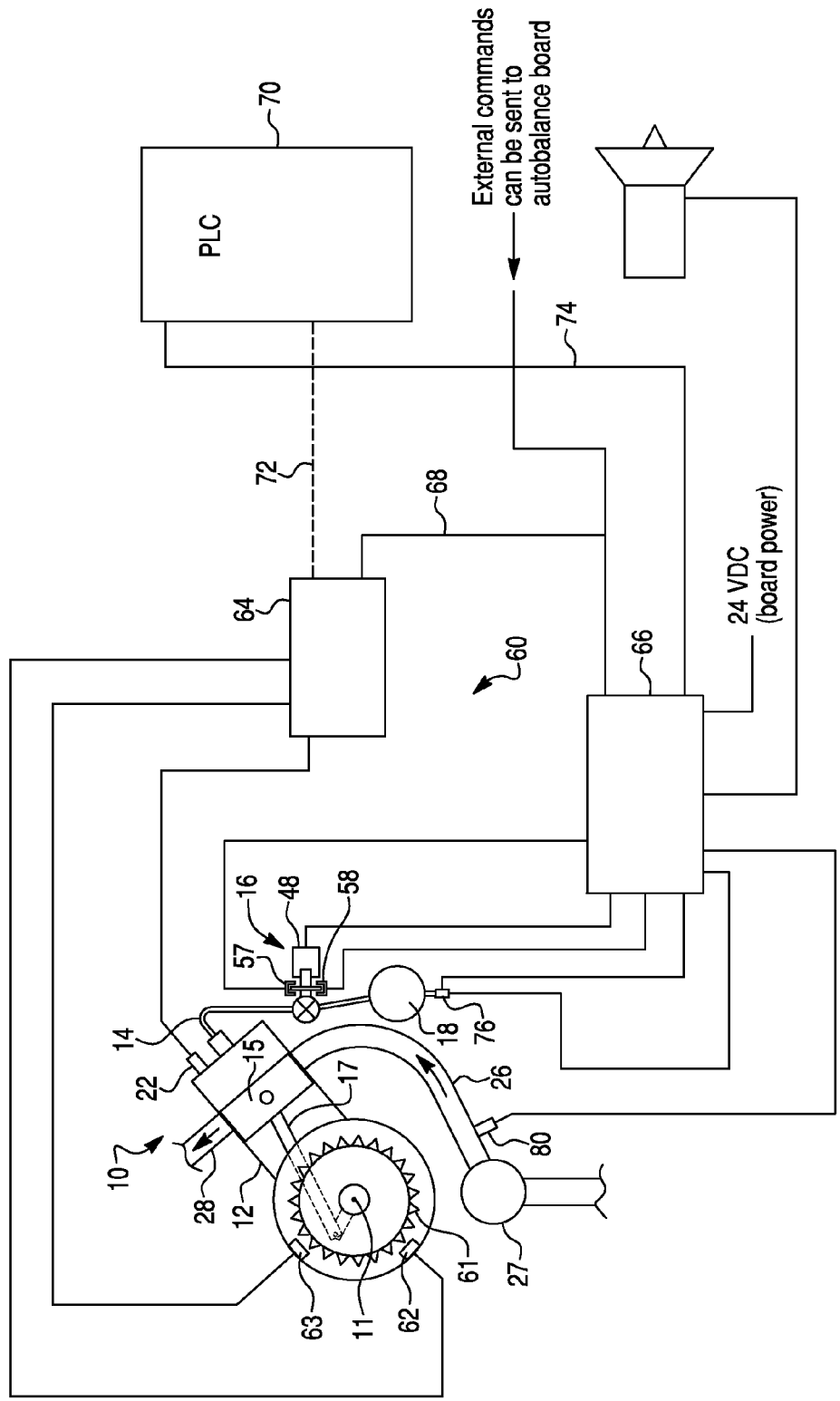
FIG. 2 is a schematic view of the internal combustion engine and the electronic control system in accordance with the exemplary embodiment of the present invention showing a side view of one of the cylinders of the engine.
Figure 3:
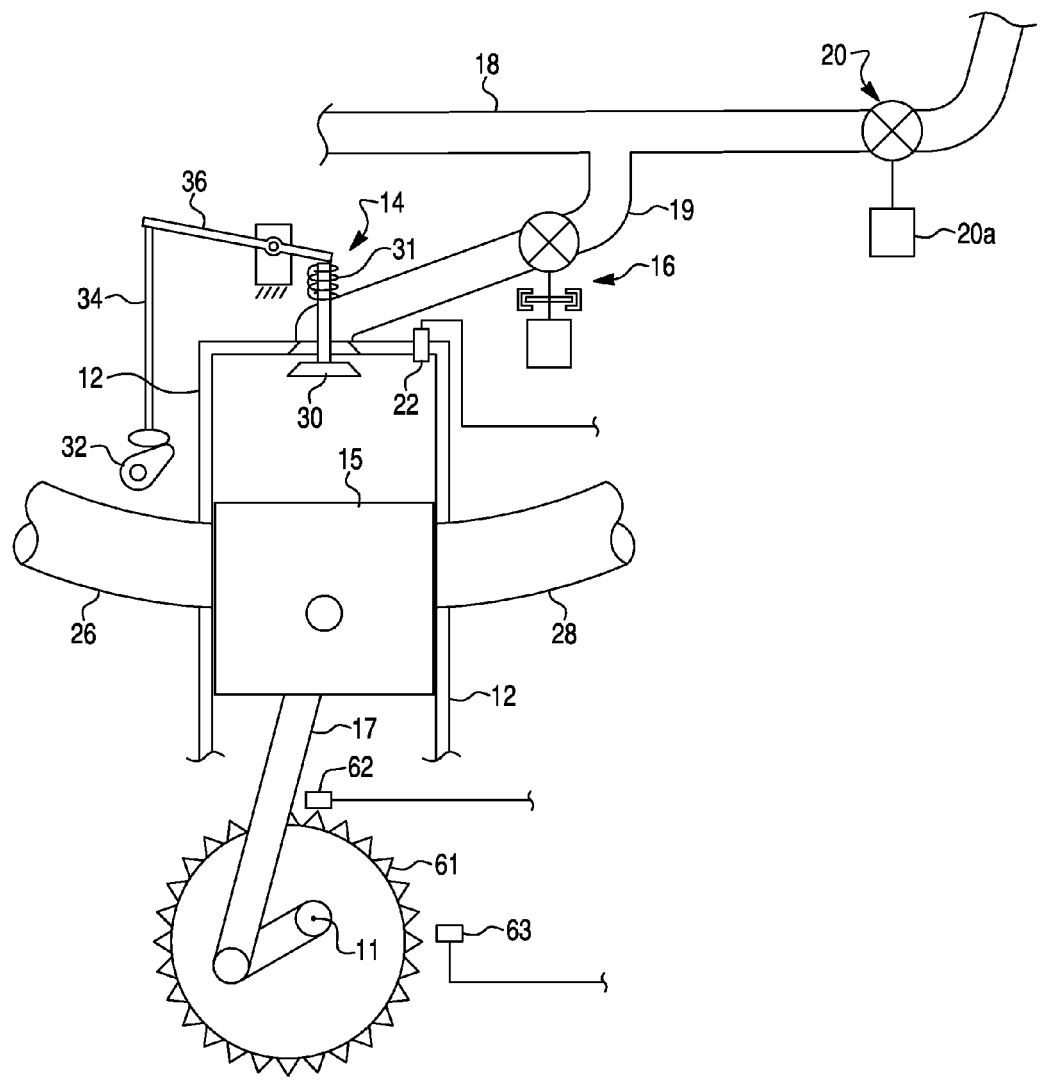
FIG. 3 is a side view of one of the cylinders of the engine in accordance with the exemplary embodiment of the present invention.

FIGS. 1-3 of the drawings illustrate the preferred exemplary embodiment of an industrial, stationary, large-bore, slow-speed internal combustion engine (ICE) 10 in accordance with the present invention. Moreover, the internal combustion engine 10 operates on gaseous fuel only, i.e., on the fuel existing in the state of a gas, not solid or liquid. Preferably, the engine 10 is a two-stroke internal combustion engine. As further illustrated in FIGS. 1-3, the engine 10 comprises a plurality of cylinders 12 each having a piston 15 reciprocating therein, and a rotating crankshaft 11 drivingly connected to the piston 15 through a conventional connecting rod 17. Each of the cylinders 12 is provided with an air intake passage 26 and an exhaust passage 28. Although, the preferred embodiment of the present invention is described with the reference to the two-stroke internal combustion engine having ten (10) substantially identical cylinders, it will be appreciated that that the present invention is equally applicable to any two- or four-stroke, compression- or spark-ignition, gaseous fuel operated internal combustion engine having two or more cylinders.

The gaseous fuel operated engine 10 further comprises a fuel rail 18, which contains the gaseous fuel at a low pressure (about 20 psi), and a fuel pressure regulator valve (a governor) 20 converting a high-pressure gaseous fuel (about 30 psi), supplied to the governor 20 via a high pressure fuel conduit 24, to a low-pressure gaseous fuel (about 20 psi) supplied by the governor 20 to the fuel rail 18. Preferably, as illustrated in FIG. 3, the governor 20 is in the form of a fluid valve, such as a ball valve, selectively controlled by an electric motor 20a. It will be appreciated that the governor 20 may be in the form of any appropriate pressure regulator valve assembly known in the art adapted to provide the gaseous fuel at a low (reduced) pressure to the fuel rail 18. Moreover, the engine 10 comprises a plurality of substantially identical direct fuel injector valves 14 each connected to the fuel rail 18 through a low pressure fuel conduit 19 and provided to selectively receive and inject an amount of gaseous fuel at a low pressure directly into the corresponding one of the cylinders 12, a corresponding plurality of substantially identical adjustable fuel-balancing valve assemblies 16 (such as motorized fuel valves made by Kiene Detroit Diesel) each fluidly connected to the fuel rail 18 and to one of the direct fuel valve injectors 14 for controlling the amount of the gaseous fuel delivered to the corresponding fuel injector valve 14 from the fuel rail 18. In other words, each of the adjustable fuel-balancing valve assemblies 16 is mounted to the corresponding low pressure fuel conduit 19 for adjusting (regulating, controlling) the amount of the gaseous fuel delivered through the low pressure fuel conduit 19 to the corresponding fuel valve 14 from the fuel rail 18. It should be understood that in operation, the gaseous fuel injected into the cylinder 12 by the fuel injector valve 14 is mixed with a certain amount of ambient air, selectively introduced into the cylinder 12 through the intake passage 26, the mixture is selectively combusted, thereby creating a pressure within each of the cylinders 12, then the exhaust gases are expelled from the cylinder 12 into the exhaust passage 28. Typically, as shown in FIG. 2, the intake air is sourced via a turbocharger 27. Moreover, the engine 10 according to the preferred embodiment of the present invention, does not have a throttle valve and the output of the engine 10 is controlled largely by the amount of the gaseous fuel supplied to the cylinders 12 by the adjustable fuel-balancing valve assemblies 16. Normally, the turbocharger 27 has a bypass (not shown) on a hot (exhaust) side so that the intake air can be grossly controlled in order to control emissions. Alternatively, the engine 10 may be provided with the throttle valve controlling the air flow through the intake passage 26.

Preferably, each of the direct fuel injector valves 14, illustrated in detail in FIG. 3, includes a fuel injector valve 30 in the form of a poppet valve adapted to reciprocate between an open and closed positions by a conventional cam actuation mechanism including a cam 32, a push rod 34 actuated by the cam 32, and a rocker arm 36 selectively pushing the fuel injector valve 30 downwardly to the open position thereof. The fuel injector valve 30 is normally biased to its closed position by a coil spring 31.

Figure 4:
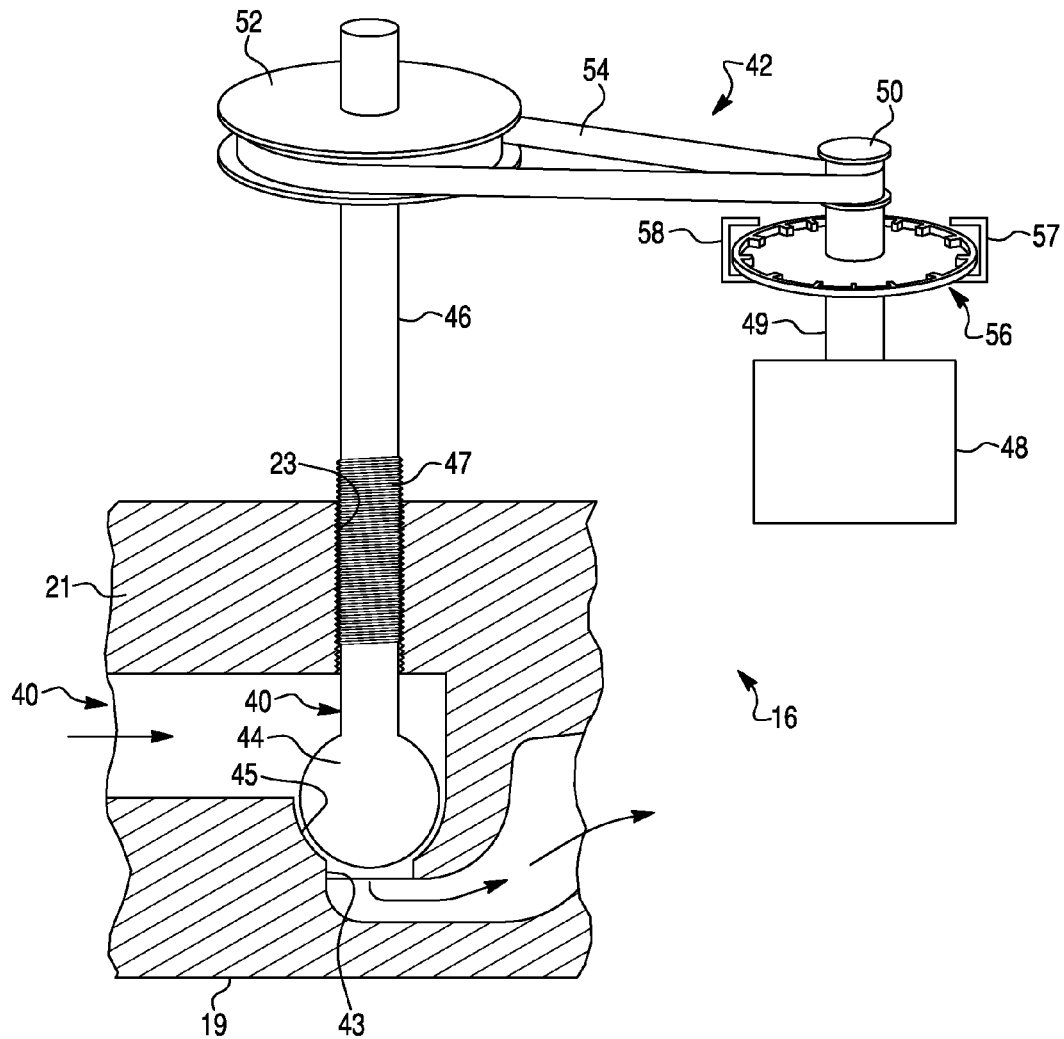
FIG. 4 is a side view of an adjustable fuel-balancing valve assembly in accordance with the exemplary embodiment of the present invention.
Figure 5:
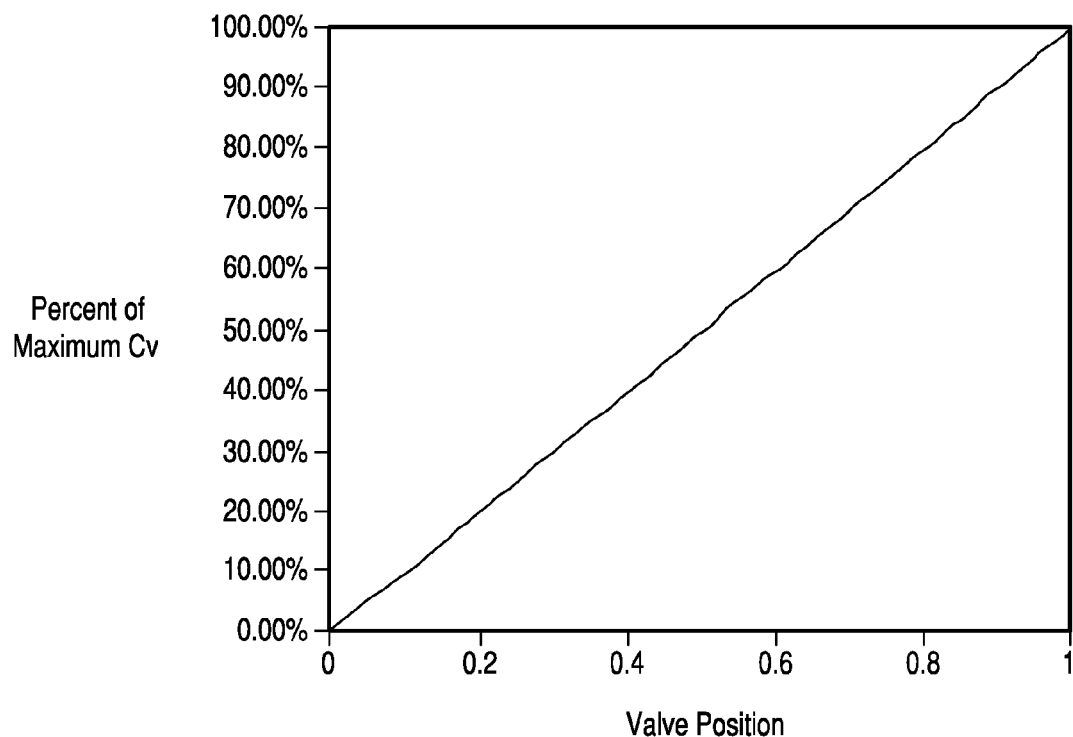
FIG. 5 is a graph of flow characteristics of a fuel-balancing valve in accordance with the exemplary embodiment of the present invention.

Furthermore, each of the adjustable fuel-balancing valve assemblies 16 according to the preferred embodiment of the present invention, as illustrated in detail in FIGS. 3 and 4, includes an adjustable fuel-balancing valve 40 operated by a valve actuator 42. In turn, the adjustable fuel-balancing valve 40 has a spherical valve member (or plug) 44 disposed within the low pressure fuel conduit 19 for controlling fluid flow through a valve opening 43 in the low pressure fuel conduit 19, and a valve stem 46 integrally formed with (or fixed to) the valve member 44 and outwardly extending therefrom through a threaded cylindrical bore 23 formed in a wall 21 of the low pressure fuel conduit 19. The valve stem 46 has a threaded outer peripheral surface 47 threadedly engaging the threaded cylindrical bore 23 in the low pressure fuel conduit 19. Accordingly, as the valve stem 46 rotates, it moves axially within the threaded cylindrical bore 23, thereby moving the valve member 44 of the ball valve 40 toward and away from a complementary valve seat 45 (defining the valve opening 43), depending on the direction of rotation of the valve stem 46. It should be understood that a flow rate $C_V$ of gaseous fuel through the adjustable fuel-balancing valve 40 is controlled by a position of the valve member 44 relative to the valve opening 43 (or the valve seat 45). Thus, the fuel-balancing valve 40 is adjusted by adjusting the position of the valve member 44 relative to the valve seat 45. Preferably, the fuel-balancing valve 40 has substantially linear flow vs. valve position characteristic, as illustrated in FIG. 5. In other words, if a position of the fuel-balancing valve 40 is 50% (50% open, or the valve position 0.5, or 50% position), the fuel flow rate $C_V$ through the fuel-balancing valve 40 is 50% of a maximum flow rate through the valve 40 when the latter is fully (100%) open (valve position 1.0). Here, the percentage of the valve position indicates in % points the distance of the valve member 44 from the valve seat 45 relative to a valve travel of the valve member 44 between the fully closed and fully open positions. Also, for the purpose of this application, it should be understood the fuel-balancing valve 40 is adjusted (opened or closed) by Δ% if the position of the valve member 44 is changed (away or toward the valve seat 45) by Δ%.

In order to move the valve member 44 to adjust the position thereof relative to the valve seat 45 (i.e., adjust the fuel-balancing valve 40), the valve actuator 42 is provided for selectively rotating the valve stem 46 to axially move the ball member 44. Such axial movement can be provided by any appropriate valve actuator mechanism designed to rotate the valve stem 46. Preferably, the valve actuator 42 includes a rotatable electric motor 48 provided for selectively rotating a drive pulley 50 non-rotatably mounted at a distal end of an output shaft 49 of the stepper motor 48. In turn, a driven pulley 52 is non-rotatably mounted at a distal end of the valve stem 46. As best shown in FIG. 4, the drive pulley 50 is drivingly connected to the driven pulley 52 through a belt 54 provided to transfer the rotational movement (drive torque) from the stepper motor 48 to the valve stem 46. As further illustrated in FIG. 4, the valve actuator 42 also includes a toothed wheel 56 non-rotatably mounted to the output shaft 49 of the electric motor 48, and first and second optical switches (sensors) 57 and 58, respectively, provided to indicate positive movement and the position of the fuel-balancing valve 40 relative to the valve seat 45. Preferably, the electric motor 48 is a small stepper motor that is speed reduced to give adequate torque to operate the fuel-balancing valve 40 with a low enough drive power to meet hazardous area limitations. The voltage and current available to the stepper motor 48 are significantly limited due to requirement to be compatible with Class I, Division 2 design criteria.

Although, the preferred embodiment of the present invention is described with the reference to the stepper motor actuated ball valve, it will be appreciated that that any appropriate motorized fluid flow control valve could be used in the stationary, gaseous fuel operated internal combustion engine 10 of the present invention. It should be understood that by adjusting the motorized fuel-balancing valves 40 (thus, the flow rate $C_V$ of gaseous fuel through the fuel-balancing valve 40), the amount of fuel delivered to the fuel injector valve 14 can be changed.

The present invention further comprises an electronic control system 60 for automatic (i.e., without human intervention), continuous pressure balancing and for diagnosis of the internal combustion engine 10 of the present invention. The electronic control system 60 according to the present invention comprises a cylinder pressure monitoring (CPM) module 64 that utilizes crankshaft-referenced dynamic pressure measurement and advanced automated software analysis of the power cylinders 12 to accurately and reliably detect engine malfunctions, and an auto-balance controller 66 for controlling the fuel-balancing valve assemblies 16 based on data provided by the CPM module 64.

As further illustrated schematically FIGS. 1-3, the electronic control system 60 also comprises a plurality of cylinder pressure sensors (pressure transducers) 22 each connected to the CPM module 64 to continuously collect cylinder pressure data, and a device for instantaneous detection of the speed and angular position of the crankshaft 11 of the engine 10 well known in the art, which includes a toothed wheel 61 non-rotatably mounted to the crankshaft 11 and electromagnetic sensors (or magnetic pickups) 62 and 62 facing the toothed wheel 61 and generates a signal indicating the speed and angular position of the crankshaft 11 of the engine 10. As shown in FIGS. 1 and 2, the magnetic pickups 62 and 62 are also connected to the CPM module 64. Moreover, each of the cylinder pressure sensors 22 is mounted to one of the cylinders 12 to monitor a pressure P within each one of the cylinders 12 (cylinder pressure) and to provide an output signal representing the cylinder pressure P. Preferably, the pressure sensors 22 are of a piezoelectric type supplied by PCB Piezotronics.

Preferably, the CPM module 64 is in the form of a printed circuit board including an embedded controller data acquisition system with a processor, which continuously gathers crank-angle referenced pressure waveforms from each pressure sensor 22 and determines peak-pressure and peak-angle statistics for the power cylinders 12. Data gathered by the controller data acquisition system of the CPM module 64 includes:
  Mean peak pressure
  Standard deviation of peak pressure
  Mean peak pressure angle
  Standard deviation of peak pressure angle
  Compression pressure
  Percent non-combustion cycles
  Percent pre-combustion cycles
  Percent over-pressure cycles
  Raw waveforms for manual analysis This data is calculated in real time for all the combustion cylinders 12 of the engine 10. The data is available to the auto-balance controller 66 via a communications link 68 (shown in FIGS. 1 and 2) and also is available to a programmable logic controller (PLC) 70 via Modbus serial communications protocol (communications link 72), shown in FIG. 2. It should be understood that the PLC is a digital computer used for automation of electromechanical processes. PLCs are used in many industries and machines. Unlike general-purpose computers, the PLC is designed for multiple inputs and output arrangements, extended temperature ranges, immunity to electrical noise, and resistance to vibration and impact. Programs to control machine operation are typically stored in battery-backed or non-volatile memory. A PLC is an example of a real time system since output results must be produced in response to input conditions within a bounded time, otherwise unintended operation will result. A key feature of the CPM module 64 is the ability to determine problems occurring in the pressure sensors 22 that would invalidate peak combustion pressure $P_{peak}$ data. Several tests such as comparing a compression pressure $P_{comp}$ of each cylinder 12 and evaluating the shape of the combustion waveform at key points are used to determine the health of each pressure sensor 22. If a sensor problem is determined by the firmware, it is noted in the status value associated with each pressure sensor 22.

The optical switches 57, 58 are connected to the auto-balance controller 66 for providing feedback to the auto-balance controller 66 to indicate positive movement and to indicate when the fuel-balancing valve 40 is close to fully open or closed positions. In turn, the auto-balance controller 66 is connected to the stepper motor 48 of each of the fuel-balancing valve assemblies 16. The electronic control system 60 further includes pressure sensors 76 and 78 located downstream and upstream of the governor 20, respectively, to monitor a pressure within the high pressure fuel conduit 24 (the pressure sensor 76) and the fuel rail 18 (the pressure sensor 78) (shown in FIG. 1). Preferably, the electronic control system 60 also includes an air pressure sensor 80 (shown in FIG. 2) provided to monitor a pressure within the intake passage 26 upstream of the turbocharger 27. The pressure sensors 76, 78 and 80 are connected to the auto-balance controller 66.

The auto-balance controller 66 is in the form of a printed circuit board including individual stepper-motor (or fuel-balancing valve) control processors for each of the fuel-balancing valve assemblies 16 and a 32-bit embedded processor that communicates with the individual fuel-balancing valve control processors, communicates with the CPM module 64 to obtain pressure data, runs the balance logic algorithms, and provides an HTML user-interface. The auto-balance controller 66 is equipped with a 4 GB flash card to provide storage of code, setup, and logging. Logging provides a history of any fuel-balancing valve movements, whether manual or automatic, and a history of any errors or exceptions. The individual valve control processors of the auto-balance controller 66 both control the stepper motor 48 (i.e., the position of the fuel-balancing valve 40 relative to the valve seat 45, thus the flow rate $C_V$ of gaseous fuel through the adjustable fuel-balancing valve 40) and get feedback from the rotation optical switches 57, 58 to verify correct movement. The processors keep track of the location of the fuel-balancing valve 40 in nonvolatile memory.

Therefore, the electronic control system 60 according to the present invention controls the adjustable fuel-balancing valve assemblies 16 for automatic, continuous pressure balancing of the internal combustion engine 10, and provides diagnostic information to an engine operator to insure that the engine performance has not deteriorated due to mechanical, control or ignition problems.

The auto-balance controller 66 is also connected to the PLC 70 through a communications link 72 (shown in FIG. 2). Both the CPM module 64 and the auto-balance controller 66 can be connected to an external personal computer (not shown) for analysis and setup. Furthermore, the user-interface for the auto-balance controller 66 is via built-in web pages, accessed via a browser anywhere on the LAN. The user interface allows for the modification of the setup parameters and for manual adjustment of fuel-balancing valve positions. It also has a feature for calibrating the initial position of fuel-balancing valves 40. The user interface gives bar charts for cylinder peak pressure balance and fuel-balancing valve position.

The present invention further comprises a method for automatic, continuous pressure balancing of an internal combustion engine. The method of the present invention comprises an engine diagnostic process (when the electronic control system 60 operates in a diagnostic mode) followed by an automatic engine balancing process of the internal combustion engine 10 (when the electronic control system 60 operates in an auto-balance mode).

First, the engine diagnostic process is initiated after engine startup or the startup of the electronic control system 60. The engine diagnostic process is conducted (executed) to ensure that the internal combustion engine 10 is functioning and is not deteriorated due to mechanical, control or ignition problems, using data continuously gathered by the CPM module 64 from the pressure sensors 22 and the electromagnetic sensors 62, 62 of the device for detection of the speed and angular position of the crankshaft 11 of the engine 10. The data gathered by the CPM module 64 includes: crank-angle referenced pressure waveforms from each of the pressure sensors 22, the peak-pressure and peak-angle statistics for the power cylinders 12, mean peak pressure, standard deviation of the peak pressure, mean peak pressure angle, standard deviation of peak pressure angle, compression pressure, percent non-combustion cycles, percent pre-combustion cycles, percent over-pressure cycles, raw waveforms for manual analysis, etc. During the engine diagnostic process several tests are conducted such as monitoring cylinder pressure P of each cylinder 12 including comparing compression pressure $P_{comp}$ of each cylinder 12 during the compression stroke of the engine 10, and evaluating the shape of the combustion waveform at key points of the engine cycle. This data is calculated in real time for all combustion cylinders 12 on the engine 10. The data are used to determine the abnormal technical condition of the engine 10 and health of each pressure sensor 22. The abnormal technical conditions of the engine 10 include: overloaded (overpressure) cylinder, detonation, pre-ignition, misfiring or dead cylinder, unstable combustion, low compression pressures, erratic peak pressure angle, etc.

Furthermore, the CPM module 64 detects an out of calibration pressure sensor or an inoperative pressure sensor to ensure that the peak pressure statistics are accurate. If any pressure sensor is not operating correctly, the CPM module 64 will alert the auto-balance controller 66 to stop the automatic engine balancing process. Also, the engine operator will be alerted to the inoperative pressure sensor. If a sensor problem is determined by the firmware, it is noted in the status value associated with each sensor 22.

Then, after completion of the engine diagnostic process and only if the engine diagnostic process determines no abnormal technical conditions of the engine 10 and all of the pressure sensors 22 are operative and properly calibrated, the automatic engine balancing process is initiated. If the engine diagnostic process determines abnormal technical conditions of the engine 10 and/or at least some or one of the pressure sensors 22 is inoperative and out of calibration, then the automatic engine balancing process is not initiated (or stopped), thus disabling the auto-balance mode of the electronic control system 60. Moreover, the electronic control system 60 generates a signal indicating abnormal technical conditions of the engine 10 and/or at least some or one of the pressure sensors 22 is inoperative and out of calibration. Preferably, an alarm is generated and displayed on HMI (Human-Machine Interface). When the electronic control system 60 disables the auto-balance mode, the engine 10 continues to operate normally, but under manual control. The fuel-balancing valves 40 remain in the last position when auto-balance mode is disabled.

Therefore, the following requirements must be met in order for the electronic control system 60 to enter the auto-balance mode:

- All pressure sensors 22 must be operating correctly and in calibration
- All fuel-balancing valve positions are within a user defined range
- All peak combustion pressure angles are within a user defined range
- Engine speed is within a user defined range
- User defined warm-up period has expired During auto-balance mode of operation, continuous testing of all user defined balance criteria will be periodically examined, preferably once per minute. If any criteria are not met, auto-balancing mode will cease and the user notified via Modbus communication link 72.

After the automatic engine balancing process is initiated, the electronic control system 60 starts operating in the auto-balance mode. The automatic engine balancing process of the present invention comprises an automatic pressure balancing procedure and an automatic fuel-balancing valve adjusting procedure.

Initially, the automatic pressure balancing procedure is executed, which includes the following steps. First, all of the fuel-balancing valves 40 are set to a user-defined set-valve position, which, preferably, is, by default, 50%. Then, the CPM module 64 continuously monitors the cylinder pressure P in each of the cylinders 12 during an engine cycle. Next, the CPM module 64 determines a peak combustion (or cylinder peak) pressure $P_{peak}$ produced in each of the cylinders 12 during a combustion stroke of the engine cycle, then calculates a mean (average value) of the peak combustion pressures $P_{peak}$ produced in all of the cylinders during the engine cycle and sends cylinder peak pressure statistics to the auto-balance controller 66. After that, a pressure difference between the mean of the peak combustion pressure of the engine 10 and the peak combustion pressure $P_{peak}$ produced in each of the cylinders 12 during combustion stroke of the engine cycle for each of the cylinders is calculated. Then, the auto-balance controller 66 determines if the pressure difference in any of the cylinders 12 is larger than a predetermined pressure value defined by the user. The predetermined pressure value is defined by the user. Preferably, the predetermined value of the peak pressure difference is 5% of the calculated mean peak combustion pressure.

Subsequently, the auto-balance controller 66 incrementally changes the amount of fuel delivered to the fuel injector valve 14 mounted to the cylinders having the pressure difference larger than the predetermined pressure value by the corresponding motorized fuel-balancing valves 40 in order to restore and maintain power cylinder balance of the engine 10. In other words, if the peak combustion pressure of any of the cylinders 12 is out of tolerance, an adjustment of user defined size will be made to any cylinder 12 out of a +/−5% window of the mean peak pressure. Specifically, the amount of fuel delivered to the fuel injector valve 14 is changed by adjusting the motorized fuel-balancing valves 40 associated with the fuel injector valve 14. Further specifically, the auto-balance controller 66 incrementally adjusts the motorized fuel-balancing valves 40. More specifically, for the cylinder(s) 12 having the pressure difference between the mean and the peak combustion pressure $P_{peak}$ more than the predetermined pressure value (preferably 5%) above the mean peak pressure, the motorized fuel-balancing valve(s) 40 associated with the cylinder(s) is(are) closed by a small value (or small step) defined by the user. Conversely, for the cylinder(s) 12 having the pressure difference between the mean and the peak combustion pressure $P_{peak}$ more than the predetermined pressure value (preferably 5%) below the mean peak pressure, the motorized fuel-balancing valve(s) 40 associated with these cylinder(s) is(are) open by the small value. Preferably, the small value is 2% of the valve position of the fuel-balancing valve 40.

Optionally, if a standard deviation of the peak combustion pressure of any of the cylinders 12 is too high, the amount fuel to that cylinder will be adjusted in an attempt to lower the standard deviation.

Preferably, the auto-balance controller 66 also estimates a position of the governor 20 by looking at the pre and post governor fuel pressure (from the pressure sensors 76, 78) to insure that the governor 20 is not reaching a control limit on the unit. If the governor 20 is approaching full open or full closed positions, the auto-balance controller 66 adjusts the motorized fuel-balancing valves 40 to return the governor 20 to a mid range position thereof.

After completion of the automatic pressure balancing procedure, the automatic fuel-balancing valve adjusting procedure is initiated. The automatic fuel-balancing valve adjusting procedure includes the following steps. First, the auto-balance controller 66 continuously monitors the valve positions $S_i$ of each of the motorized fuel-balancing valves 40 of the engine 10 using the optical switches 57 and 58. Then, the auto-balance controller 66 calculates an average (mean) valve position $S_{av}$ of all of the motorized fuel-balancing valves 40 using data from the optical switches 57 and 58. After that, a position difference between the average valve position $S_{av}$ and the valve positions $S_i$ of each of the motorized fuel-balancing valves 40 of the engine 10 is determined. Then, the auto-balance controller 66 determines if the position difference in any of the cylinders 12 is larger than a predetermined position value defined by the user. The predetermined position value is defined by the user. Preferably, the predetermined position value of the position difference is 2% of the calculated average valve position $S_{av}$.

Subsequently, the auto-balance controller 66 incrementally changes the amount of fuel delivered to the fuel injector valve 14 mounted to the cylinders having the position difference larger than the predetermined position value by the corresponding motorized fuel-balancing valves 40. In other words, if the valve positions $S_i$ of any of the motorized fuel-balancing valves 40 is out of tolerance, an adjustment of user defined size will be made to any motorized fuel-balancing valve 40 out of a +/−2% window of the average valve position $S_{av}$. Specifically, the auto-balance controller 66 incrementally adjusts the motorized fuel-balancing valves 40. More specifically, for the motorized fuel-balancing valves 40 having the valve position $S_i$ thereof bigger than the average valve position $S_{av}$ by more than the predetermined value (preferably 2%), the motorized fuel-balancing valves 40 are closed by a small value defined by the user. Conversely, for the motorized fuel-balancing valves 40 having the valve position $S_i$ thereof smaller than the average valve position $S_{av}$ by more than the predetermined value (preferably 2%), the motorized fuel-balancing valves 40 are open by the small value. Preferably, the small value is 2% of the valve position of the fuel-balancing valve 40.

The above steps of the automatic engine balancing process are periodically repeated at a predetermined time interval as defined by the user. Preferably, the automatic engine balancing process is repeated every 1 minute interval.

With the engine combustion pressure balance assured, an important aspect of emission control system can be implemented that is not possible on an engine that is not peak pressure balanced. This is achieved by automatically controlling inlet air manifold pressure to control the average peak combustion pressure of the engine. Emissions testing will determine the optimal average peak combustion pressure for a given output torque of the engine. The result of this testing is that a curve of torque vs. desired average peak combustion pressure is generated. This curve is programmed into the engines existing control system which can control the inlet air pressure, which in turn controls the average peak combustion pressure. At this optimal average peak combustion pressure, NOx emissions are minimized.

The method and apparatus for automatic pressure balancing of an internal combustion engine according to the present invention provide a simple, reliable, and low cost system to insure improved performance of a mechanically healthy engine that can maintain a good balance state at low operating cost. Another advantage of the method and apparatus of the present invention is that if the auto-balance controller becomes inoperative, or any condition is present that prevents the automatic balance method, the ability to operate the engine will not be affected.

The method and apparatus of the present invention automatically balance the power distribution of an engine among the individual cylinders, preventing unexpected overloading of individual cylinders, thus preventing unacceptable emissions production of the engine. The manually operated balancing valves are replaced with electronically controlled motorized fuel-balancing valves and an auto-balance controller to control them. In other words, the present invention allows for simple and low cost retrofitting of the existing stationary, large-bore, slow-speed internal combustion engine with the apparatus of the present invention. Individual cylinder's combustion pressure is required to be continuously monitored by means of a pressure sensor installed on each cylinder and a means to measure and calculate the pressure statistics (a cylinder pressure monitoring (CPM) module).

The most significant advantages of the method and apparatus of the present invention are:

1. Undesired emissions production is minimized continuously at all operating conditions.
2. Undesirable and destructive operation of over-loaded power cylinders is detected and prevented.
3. Mechanical diagnostic information is provided such that mechanical malfunctions such as ignition system problems, air delivery (turbocharger) problems, etc. will be detected.
4. Fuel consumption may be optimized by optimizing the peak firing pressure deviations.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiment disclosed hereinabove was chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for pressure balancing an internal combustion engine; said engine including a plurality of cylinders each having a reciprocating piston and a rotating crankshaft operatively connected to said piston, a plurality of fuel injector valves each provided to selectively deliver an amount of fuel directly into one of said cylinders, a corresponding plurality of adjustable fuel-balancing valves each fluidly connected to one of said fuel injector valves for controlling the amount of fuel delivered to said one of said fuel injector valves and a plurality of cylinder pressure sensors each mounted to one of said cylinders to sense a pressure within one of said cylinders and to provide an output signal representing said cylinder pressure; said method comprising an automatic engine balancing process including an automatic pressure balancing procedure including the steps of:

a) monitoring a cylinder pressure in each of said cylinders during an engine cycle;
   b) determining a peak combustion pressure produced in each of said cylinders during the engine cycle;
   b) calculating a mean of said peak combustion pressures produced in all of said cylinders during the engine cycle;
   c) calculating a pressure difference between said mean and said peak combustion pressure produced in each of said cylinders during the engine cycle for each of said cylinders; and
   d) incrementally adjusting the amount of fuel delivered by one of said adjustable fuel-balancing valves to the corresponding one of said fuel injector valves mounted to one of said cylinders having said pressure difference larger than a predetermined pressure value.

2. The method for balancing said internal combustion engine as defined in claim 1, wherein the step of incrementally adjusting the amount of fuel delivered by one of said adjustable fuel-balancing valves is the step of incrementally adjusting a valve position of one of said fuel-balancing valves corresponding to one of said cylinders having said pressure difference larger than said predetermined pressure value by a small value.

3. The method for balancing said internal combustion engine as defined in claim 2, wherein for one of said cylinders having said pressure difference more than said predetermined pressure value above said mean peak pressure, said fuel-balancing valve is closed by said small value; and wherein for one of said cylinders having said pressure difference more than said predetermined pressure value below said mean peak pressure, said fuel-balancing valve is open by said small value.

4. The method for balancing said internal combustion engine as defined in claim 1, wherein said predetermined pressure value is 5% of said mean of said peak combustion pressures.

5. The method for balancing said internal combustion engine as defined in claim 2, wherein said small value is 2% of said valve position of said fuel-balancing valve.

6. The method for balancing said internal combustion engine as defined in claim 1, further including the step of setting said fuel-balancing valves to a set-valve position, which is executed prior to the step a) of monitoring said cylinder pressure in each of said cylinders during an engine cycle.

7. The method for balancing said internal combustion engine as defined in claim 6, wherein said set-valve position of said fuel-balancing valves is 50%.

8. The method for balancing said internal combustion engine as defined in claim 1, wherein said automatic engine balancing process further includes an automatic fuel-balancing valve adjusting procedure executed following said automatic pressure balancing procedure, said fuel-balancing valve adjusting procedure includes the steps of:

monitoring valve positions of each of said fuel-balancing valves of said engine;

calculating an average valve position of all of said motorized fuel-balancing valves;

determining a position difference between said average valve position and said valve positions of each of said fuel-balancing valves of said engine;

determining if said position difference in any of said cylinders of said engine is larger than a predetermined position value; and incrementally changing the amount of fuel delivered to said fuel injector valve mounted to said cylinders having said position difference larger than said predetermined position value by said corresponding motorized fuel-balancing valves.

9. The method for balancing said internal combustion engine as defined in claim 8, wherein the step of incrementally changing the amount of fuel delivered by one of said adjustable fuel-balancing valves is the step of incrementally adjusting a valve position of one of said fuel-balancing valves corresponding to one of said cylinders having said position difference larger than said predetermined position value by a small value.

10. The method for balancing said internal combustion engine as defined in claim 9, wherein for one of said cylinders having said position difference more than said predetermined position value above said average valve position, said fuel-balancing valve is closed by said small value; and wherein for one of said cylinders having said position difference more than said predetermined position value below said average valve position, said fuel-balancing valve is open by said small value.

11. The method for balancing said internal combustion engine as defined in claim 8, wherein said predetermined position value is 5% of said average valve position of said fuel-balancing valves.

12. The method for balancing said internal combustion engine as defined in claim 9, wherein said small value is 2% of said valve position of said fuel-balancing valve.

13. The method for balancing said internal combustion engine as defined in claim 8, wherein said automatic engine balancing process is periodically repeated at a predetermined time interval.

14. The method for balancing said internal combustion engine as defined in claim 13, wherein said predetermined time interval is 1 minute.

15. The method for balancing said internal combustion engine as defined in claim 1, further comprising an engine diagnostic process executed prior to said automatic engine balancing process to ensure that said internal combustion engine is functioning and is not deteriorated due to mechanical, control or ignition malfunctions.

16. The method for balancing said internal combustion engine as defined in claim 15, wherein said engine diagnostic process includes the steps of:

monitoring a cylinder pressure in each of said cylinders using data continuously gathered from said cylinder pressure sensors;

determining a peak combustion pressure and a compression pressure produced in each of said cylinders during the engine cycle;

calculating a standard deviation of said peak combustion pressure, a mean peak pressure angle and a standard deviation of peak pressure angle; and determining abnormal technical condition of said engine and condition of each of said cylinder pressure sensors based on data calculated in the previous step.

17. The method for balancing said internal combustion engine as defined in claim 16, wherein said abnormal technical condition of said engine includes at least one of cylinder overpressure, detonation, pre-ignition, misfiring, unstable combustion, low compression pressure and erratic peak pressure angle.

18. The method for balancing said internal combustion engine as defined in claim 15, wherein said engine diagnostic process is initiated after engine startup.

19. An apparatus for automatic pressure balancing of an internal combustion engine; said engine including a plurality of cylinders each having a reciprocating piston and a rotating crankshaft operatively connected to said piston, a plurality of fuel injector valves each provided to selectively deliver an amount of fuel directly into one of said cylinders and a corresponding plurality of adjustable fuel-balancing valves each fluidly connected to one of said fuel injector valves for controlling the amount of fuel delivered to said one of said fuel injector valves; said apparatus comprising:

a plurality of cylinder pressure sensors each mounted to one of said cylinders to sense a pressure within one of said cylinders and to provide an output signal representing said cylinder pressure;

a device for instantaneous detection of a speed and angular position of a crankshaft of said engine generating a signal indicating said speed and angular position of said crankshaft of said engine;

a plurality of valve position sensors each provided to indicate a positive movement and a position of one of said fuel-balancing valves;

a cylinder pressure monitoring (CPM) module receiving data from said cylinder pressure sensors and said engine crankshaft speed and angular position detection device; and an auto-balance controller for controlling said fuel-balancing valves based on data provided by said CPM module and said valve position sensors;

said CPM module provided for monitoring a cylinder pressure in each of said cylinders during an engine cycle, determining a peak combustion pressure produced in each of said cylinders during the engine cycle, calculating a mean of said peak combustion pressures produced in all of said cylinders during the engine cycle and calculating a pressure difference between said mean and said peak combustion pressure produced in each of said cylinders during the engine cycle for each of said cylinders;

said auto-balance controller provided for incrementally adjusting the amount of fuel delivered by one of said adjustable fuel-balancing valves to the corresponding one of said fuel injector valves mounted to one of said cylinders having said pressure difference larger than a predetermined pressure value.

20. The apparatus for automatic pressure balancing of said internal combustion engine as defined in claim 19, wherein said auto-balance controller incrementally adjusts the amount of fuel delivered by one of said adjustable fuel-balancing valves by incrementally adjusting a valve position of one of said fuel-balancing valves corresponding to one of said cylinders having said pressure difference larger than said predetermined pressure value by a small value.

21. The apparatus for automatic pressure balancing of said internal combustion engine as defined in claim 20, wherein for one of said cylinders having said pressure difference more than said predetermined pressure value above said mean peak pressure, said auto-balance controller closes said fuel-balancing valve by said small value; and wherein for one of said cylinders having said pressure difference more than said predetermined pressure value below said mean peak pressure, said auto-balance controller opens said fuel-balancing valve by said small value.

22. The apparatus for automatic pressure balancing of said internal combustion engine as defined in claim 19, wherein said predetermined pressure value is 5% of said mean of said peak combustion pressures.

23. The apparatus for automatic pressure balancing of said internal combustion engine as defined in claim 20, wherein said small value is 2% of said valve position of said fuel-balancing valve.

24. The apparatus for automatic pressure balancing of said internal combustion engine as defined in claim 19, wherein said auto-balance controller is further provided for monitoring valve positions of each of said fuel-balancing valves of said engine, calculating an average valve position of all of said fuel-balancing valves, determining a position difference between said average valve position and said valve positions of each of said fuel-balancing valves of said engine, determining if said position difference in any of said cylinders of said engine is larger than a predetermined position value and incrementally changing the amount of fuel delivered to said fuel injector valve mounted to said cylinders having said position difference larger than said predetermined position value by said corresponding fuel-balancing valves.

25. The apparatus for automatic pressure balancing of said internal combustion engine as defined in claim 24, wherein said auto-balance controller incrementally changes the amount of fuel delivered by one of said adjustable fuel-balancing valves by incrementally adjusting a valve position of one of said fuel-balancing valves corresponding to one of said cylinders having said position difference larger than said predetermined position value by a small value.

26. The apparatus for automatic pressure balancing of said internal combustion engine as defined in claim 25, wherein for one of said cylinders having said position difference more than said predetermined position value above said average valve position, said auto-balance controller closes said fuel-balancing valve by said small value; and wherein for one of said cylinders having said position difference more than said predetermined position value below said average valve position, said auto-balance controller opens said fuel-balancing valve by said small value.

27. The apparatus for automatic pressure balancing of said internal combustion engine as defined in claim 24, wherein said predetermined position value is 5% of said average valve position of said fuel-balancing valves.

28. The apparatus for automatic pressure balancing of said internal combustion engine as defined in claim 25, wherein said small value is 2% of said valve position of said fuel-balancing valve.

29. The apparatus for automatic pressure balancing as defined in claim 19, wherein each of said fuel-balancing valves is operated by a valve actuator including an electric motor so that said auto-balance controller controls said fuel-balancing valves by operating said electric motor.

30. The apparatus for automatic pressure balancing of said internal combustion engine as defined in claim 19, wherein said CPM module is further provided for calculating a standard deviation of said peak combustion pressure, a mean peak pressure angle and a standard deviation of peak pressure angle, and determining abnormal technical condition of said engine and condition of each of said cylinder pressure sensors based on data calculated in the previous step.

31. The apparatus for automatic pressure balancing of said internal combustion engine as defined in claim 30, wherein said abnormal technical condition of said engine includes at least one of cylinder overpressure, detonation, pre-ignition, misfiring, unstable combustion, low compression pressure and erratic peak pressure angle.

32. The apparatus for automatic pressure balancing of said internal combustion engine as defined in claim 19, wherein said CPM module is further provided to determine in real time for all of said combustion cylinders of said engine peak-angle statistics for each of the engine cylinders including standard deviation of said peak pressure, mean peak pressure angle, standard deviation of peak pressure angle, compression pressure, percent of non-combustion cycles, percent of pre-combustion cycles and percent over-pressure cycles, said engine peak-pressure and peak-angle statistics are used by said CPM module to detect engine malfunctions.

* * * * *